2,669,839

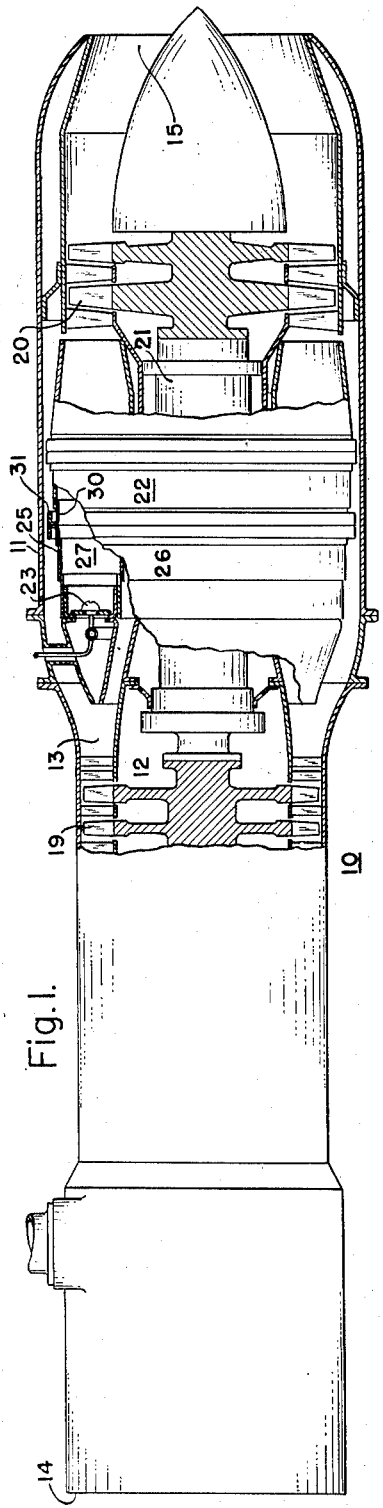
Feb. 23, 1954  M. S. SABOE  2,669,839
COMBUSTION APPARATUS
Filed Sept. 17, 1951
INVENTOR
Michael S. Saboe
BY
ATTORNEY Patented Feb. 23, 1954

UNITED STATES PATENT OFFICE 2,669,839

COMBUSTION APPARATUS

Michael S. Saboe, Norristown, Pa., assignor to Westinghouse Electric Corporation, East Pittsburgh, Pa., a corporation of Pennsylvania Application September 17, 1951, Serial No. 246,963

4 Claims. (Cl. 60—39.65)

1

This invention relates to combustion apparatus for gas power plants, and has for an object the provision of an improved combustion chamber liner constructed and arranged to ensure adequate rigidity to prevent deformation due to gas pressure.

Another object of the invention is to provide a combustion chamber liner comprising annular members having stiffener band portions adapted to afford the desired rigidity without restraining axial expansion of the liner.

A further object is the provision of durable combustion apparatus of light construction, which may readily be manufactured at reasonable cost for use in an aviation gas engine.

It is another object of the invention to provide an annular combustion chamber liner comprising a plurality of corrugated cylindrical portions joined by concentric channel portions arranged back-to-back and welded together in a manner such as to minimize localized differential expansion between the cylindrical portions and channel portions, while ensuring adequate stiffness with minimum restraint of axial expansion of the liner structure as a whole.

These and other objects are effected by the invention as will be apparent from the following description and claims taken in connection with the accompanying drawing, forming a part of this application, in which:

Fig. 1 is a longitudinal diagrammatic view, partly in section, of a typical aviation gas turbine power plant having combustion apparatus constructed in accordance with the invention;

Fig. 2 is an enlarged detail sectional view of a portion of the combustion chamber liner shown in Fig. 1; and, Fig. 3 is a fragmentary sectional view taken along the line III—III of Fig. 2.

As illustrated in Fig. 1 of the drawing, a typical gas turbine power plant 10, with which the invention is adapted to be associated, may be mounted in a suitable compartment of an aircraft (not shown), and may comprise an outer generally cylindrical casing structure 11 having longitudinally mounted therein a core structure 12, forming an annular passageway, generally indicated at 13, which constitutes a fluid flow communication extending through the plant from a forwardly directed air inlet opening 14 to a rearwardly disposed exhaust nozzle 15. The usual operating components of the power plant 10 are arranged in axial alignment therein, and include an axial flow compressor 19, a driving turbine 20 connected thereto by means of a shaft 21, and annular combustion apparatus 22, which is interposed in the passage 13 between the discharge end of the compressor and the inlet of the turbine. In operation, air entering the inlet opening 14 is compressed by the compressor 19 and delivered through passage 13 to the combustion apparatus 22. Fuel supplied to the combustion apparatus, by way of suitable means such as nozzles 23, is burned in the stream of air under pressure, creating motive gases which are expanded through the turbine 20 and finally discharged to atmosphere through the nozzle 15, establishing a propulsive thrust.

The combustion apparatus 22 embodying the invention is preferably annular in form, although the features of the invention are readily adapted to be employed in combustion apparatus of the multiple unit or cell type, in case structural and operational characteristics of the power plant favor such design. The combustion apparatus 22 comprises outer and inner sectional annular walls 25 and 26, which are preferably formed of rolled chrome-nickel steel alloy and enclose a generally diverging combustion chamber 27. The outer wall 25 may consist of an assembly of a number of overlapped annular sections, including reinforcing units 30 and 31 which are interposed between and partially telescoped with spacer portions 32 having longitudinal corrugations. The inner wall 26 may likewise constitute an assembly including overlapped sections which are concentric with those of outer wall 25. Suitable inlets for admitting air are formed in both walls 25 and 26, by means of the corrugations of the spacers 32 interposed between the other overlapping portions of the assembled walls. The forward wall sections may be supported on radially disposed struts extending between the inner and outer casings 12 and 11, respectively.

The two reinforcing units 30 and 31 of the combustor outer wall 25 are similar in construction, although the unit 31 is slightly larger in diameter in the form of the invention chosen for illustration. With reference to Fig. 2, which shows portions of the two adjoining cylindrical reinforcing units in section, the larger unit 31 will be described as representative of both.

The reinforcing unit 31 comprises a pair of annular channel sections 33 having overlapping, spaced outer and inner flanges $a$ and $b$ which extend substantially parallel to the central axis of the channel sections. The radially disposed web $c$ of the channel sections are secured together, as by spot welding, and have formed therein a plurality of air flow openings 34. Preferably, the inner flanges b are relatively long and provide end portions which are adapted to be welded or otherwise suitably secured to the corrugated spacers 32 at either end of the reinforcing unit, as best shown in Fig. 2.

From the foregoing it will thus be seen that each reinforcing unit, comprising the channel sections 33 arranged back-to-back, is adapted to be secured to adjacent liner members in a manner which will avoid restraint in axial expansion, while minimizing undesired concentration of stresses due to differential expansion between the unit and each liner member. A combustor liner provided with such reinforcing units will be less difficult to manufacture than has heretofore been the case, and will have favorable strength and weight characteristics. Improved durability and longer service life are also promoted by this construction, since cooling air admission ports may safely be formed quite close together in the stiffened walls of the improved combustion chamber liner. It will be understood that a combustion chamber liner may, if desired, be equipped through any portion as well as all of its axial extent with any suitable number of reinforcing units embodying the invention. If preferred, the outer flange a of each unit may be given a definite outward cant or slope to gain further stiffness and to facilitate tooling and manufacturing.

While the invention has been shown in but one form, it will be obvious to those skilled in the art that it is not so limited, but is susceptible of various changes and modifications without departing from the spirit thereof.

What I claim is:

1. Combustion apparatus comprising a spaced diverging outer cylindrical wall assemblage forming a combustion chamber, said wall assemblage including annular wall sections of graduated diameters having longitudinal corrugations formed parallel to the axis thereof, and at least one annular reinforcing unit interposed between such wall sections, said reinforcing unit consisting of a pair of annular channel sections each having radially spaced annular flanges extending longitudinally of the axis, and radially extending webs disposed in engagement and secured together, each channel section having a portion of the radially innermost flange extending into engagement with one of said corrugated wall sections, the outer flanges being free from contact with said elements of the assemblage but serving to augment the stiffening effect.

2. Combustion apparatus comprising a spaced diverging outer cylindrical wall assemblage forming a combustion chamber, said wall assemblage including annular wall sections of graduated diameters having longitudinal corrugations formed parallel to the axis thereof, and at least one annular reinforcing unit interposed between such wall sections, said reinforcing unit comprising a pair of similar annular channel sections having abutting web portions and oppositely extending outer and inner flange portions, said flange portions extending substantially parallel to the axis of the unit, said inner flange portions having their ends secured to the adjacent corrugated wall sections, said web portions and outer flange portions projecting exteriorly of said combustion chamber and serving to stiffen the wall assemblage.

3. Combustion apparatus as set forth in claim 2 wherein a plurality of cooling air openings are formed in the web portions of the reinforcing unit.

4. Stepped tubular wall structure for a combustion chamber liner comprising a plurality of generally cylindrical sections of graduated diameters assembled in overlapped and diverging relation, and at least one annular reinforcing unit interposed in said liner comprising a pair of annular channel sections having abutting web portions and axially extending outer and inner flange portions, said web portions being secured together to provide an I-beam structure and having spaced openings, said inner flange portions being elongated and secured to adjacent sections of the liner with said web portions and outer flange portions disposed outwardly thereof to impart stiffness to the wall structure.

MICHAEL S. SABOE.

References Cited in the file of this patent

UNITED STATES PATENTS

| Number | Name | Date |
|---|---|---|
| 2,525,206 | Clarke | Oct. 10, 1950 |
| 2,537,033 | Christensen | Jan. 9, 1951 |
| 2,552,851 | Gist | May 15, 1951 |
| 2,569,446 | Bonvillian et al. | Oct. 2, 1951 |
| 2,573,694 | De Zubay et al. | Nov. 6, 1951 |

FOREIGN PATENTS

| Number | Country | Date |
|---|---|---|
| 579,424 | Great Britain | Aug. 2, 1946 |